United States Patent [19]

Authement et al.

[11] 3,963,013
[45] June 15, 1976

[54] AIR AND FUEL CHARGE FORMING DEVICE

[76] Inventors: Elmo C. Authement, 103 Nicholls Drive; Gasper G. Varvaro, Box 514, Rte. 2, both of Thibodaux, La. 70301; Frank S. Stupka, Box 142, Rte. 2, Bogalusa, La. 70427; Obierge J. Waguespack, 1020 People St.; Sidney J. Tabor, Box 630-P, Rte. 1, both of Thibodaux, La. 70301; Mario R. Guell, 617 W. Third St., Bogalusa, La. 70427

[22] Filed: July 23, 1974

[21] Appl. No.: 490,924

[52] U.S. Cl. ............................ 123/133; 123/122 E
[51] Int. Cl.² ........................................ F02M 17/18
[58] Field of Search ............ 123/133, 122 E, 122 H, 123/122 AB, 122 AC, 122 A, 122 AA

[56] References Cited
UNITED STATES PATENTS

| | | | |
|---|---|---|---|
| 2,315,881 | 4/1943 | Thomas | 123/133 |
| 3,738,334 | 6/1973 | Farr | 123/133 |
| 3,788,283 | 1/1974 | Perry | 123/133 |
| 3,789,817 | 2/1974 | Morel | 123/133 |
| 3,794,000 | 2/1974 | Hodgkinson | 123/133 |

*Primary Examiner*—Charles J. Myhre
*Assistant Examiner*—R. H. Lazarus
*Attorney, Agent, or Firm*—Clarence A. O'Brien; Harvey B. Jacobson

[57] ABSTRACT

A fuel and air induction system is provided for an internal combustion engine and includes a conventional air and fuel mixing carburetor for starting the engine when cold. However, when operating temperatures of the engine are obtained the air and fuel induction system is operative to substantially fully vaporize liquid fuel by heating the induction air and spraying fuel into the heated induction air in a manner that completely vaporizes the fuel and this vaporized fuel is then mixed with supplemental induction air which has also been heated and passed through the conventional carburetor into the intake passages of the engine, the supply of liquid fuel to the carburetor being terminated after operating temperatures of the engine are achieved.

10 Claims, 4 Drawing Figures

3,963,013

AIR AND FUEL CHARGE FORMING DEVICE

BACKGROUND OF THE INVENTION

With the increased emphasis on fuel economy and reduced exhaust emissions, various procedures and methods of increasing the efficiency of internal combustion engines and reducing the exhaust emissions thereof are being tested and evaluated. However, most air and fuel induction systems which may be efficient at one operating temperature are inefficient at other engine operating temperatures. Various types of structures have been incorporated into air and fuel induction systems designed to promote fuel economy and reduce exhaust pollution, but many of these have proven ineffective, at least to some degree.

Examples of previously patented air and fuel charge forming devices may be found in U.S. Pat. Nos: 3,789,817; 3,765,382; 3,738,334; 3,728,856; 3,699,938; 3,667,436; 3,618,579; 3,554,174; 3,496,919; 3,354,872; 2,748,758; 2,461,411 and 2,205,750.

BRIEF DESCRIPTION OF THE INVENTION

The air and fuel charge forming device of the instant invention utilizes a conventional carburetor for starting the associated combustion engine when the latter is cold and provides structure for heating the induction air and subjecting at least a portion of the heated induction air to a spray discharge of liquid fuel for fully vaporizing the fuel before passing the vaporized fuel enriched heated induction air through the conventional carburetor when operating temperatures have been reached, the supply of liquid fuel to the conventional carburetor being terminated when operating temperatures have been reached.

The main object of this invention is to provide an air and fuel charge forming device which will be capable of increasing the fuel economy of a combustion engine and reducing the exhaust emissions of the engine, at least at such time as the engine reaches its operating temperature.

Another object of this invention, in accordance with the immediately preceding object, is to provide an air and fuel charge forming device which may be readily incorporated into the manufacture of present day vehicle internal combustion engines.

Still another object of this invention is to provide an air and fuel charge forming device which may be readily added to vehicle combustion engines which are already in use.

Yet another object of this invention is to provide an air and fuel charge forming device which utilizes a supercharger to establish intake manifold pressures as opposed to intake manifold vacuum during operation of the associated engine and to thereby increase the power output of an engine of a given size in order that a smaller engine constructed in accordance with the present invention will have the power output potential equal to a considerably larger engine having a conventional air and fuel intake system.

A final object of this invention to be specifically enumerated herein is to provide an air and fuel charge forming device which will conform to conventional forms of manufacture, be of simple construction and substantially automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
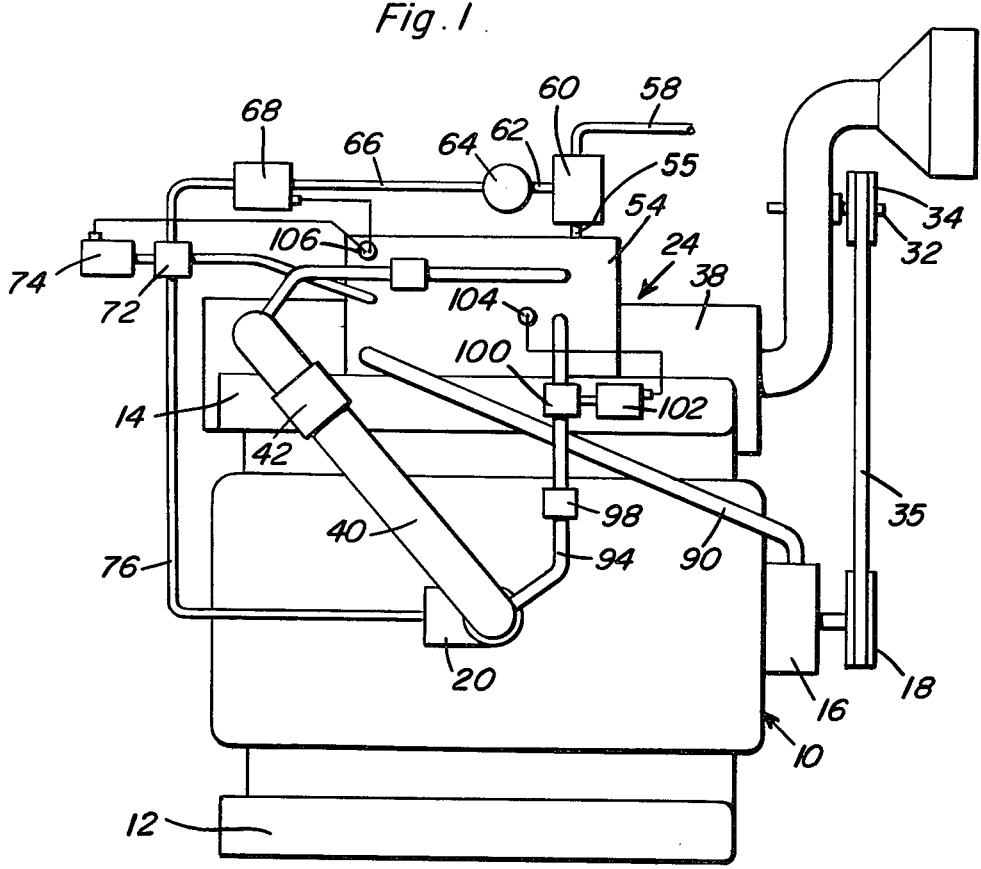
FIG. 1 is a schematic top plan view of a conventional vehicle internal combustion engine equipped with the air and fuel charge forming device of the instant invention.
Figure 2:
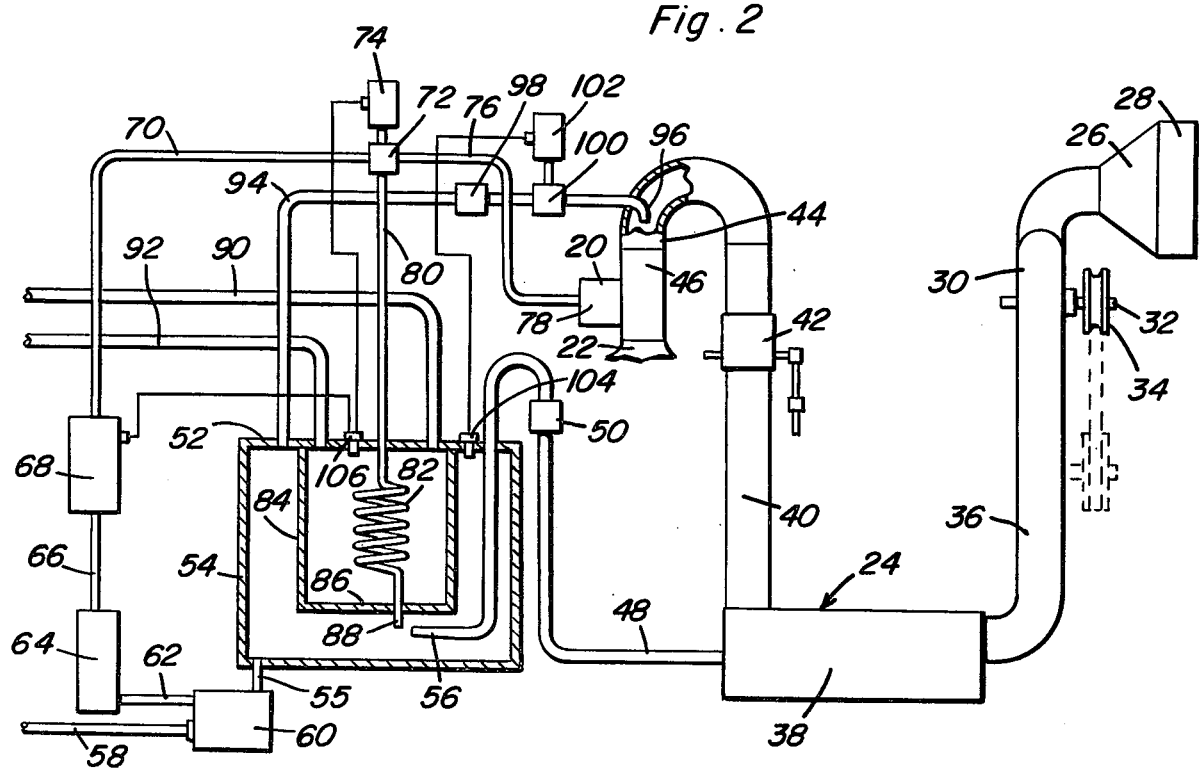
FIG. 2 is a further schematic view illustrating the working components of the air and fuel charge forming device, with only the intake manifold and conventional carburetor of the associated engine being illustrated.

Referring now more specifically to FIGS. 1 and 2 of the drawings, the numeral 10 generally designates a conventional form of combustion engine including a pair of opposite side exhaust manifolds 12 and 14, a motor driven water pump 16 provided with a pulley 18 and a conventional carburetor 20 mounted on an intake manifold 22 of the engine 10.

The air and fuel charge forming device of the instant invention is referred to in general by the reference numeral 24 and includes an air inlet 26 including an air filter 28. The air inlet 26 opens into the intake of an air pump or supercharger 30. The air pump 30 is of the rotary type and includes a rotary input shaft 32 upon which a pulley 34 is mounted and the pulley 18 is drivingly coupled to the pulley 34 by means of an endless flexible belt 35.

The air pump 30 includes an outlet pipe 36 which opens into a heat exchanger box or chamber 38 disposed in good heat transfer relation with the exhaust manifold 14 and the heat exchanger box 38 includes a primary air outlet pipe 40 provided with a check valve assembly 42 intermediate its opposite ends and including an outlet end 44 in closed communication with the air intake 46 of the carburetor 20. The heat exchanger box 38 additionally includes a secondary air outlet pipe 48 also provided with a check valve 50 and which opens downwardly through the top wall 52 of an evaporator tank 54 and terminates downwardly within the latter in a horizontally directed jet-type outlet 56.

The engine 10 further includes a gasoline supply line 58 comprising the discharge line from an engine driven fuel pump (not shown) and the line 58 opens into a float chamber 60. The float chamber 60 includes an internal float assembly (not shown) for maintaining the level of fuel in the chamber 60 at a predetermined level. The float chamber 60 includes an outlet pipe 62 which extends to the inlet of an electric fuel pump 64 and the fuel pump 64 includes an outlet line 66 which extends to an electric heater 68 for heating the discharge of liquid fuel from the pump 64. The heater 68 includes an outlet pipe 70 which extends to a three-way valve 72 actuated by a solenoid 74 and the valve 72 includes a first outlet pipe 76 which extends to the float chamber 78 of the carburetor 20 and a second outlet pipe 80 which extends downwardly through the top wall 52 and includes a lower end coil 82 disposed within a heat exchanger tank 84 disposed within the tank 54. The lower end of the pipe 80 disposed below the coil 82 extends downwardly through the bottom 86 of the tank 84 and terminates in a discharge nozzle 88 in registry with the nozzle-type outlet 56 of the secondary induction air pipe 48.

The water pump 16 includes a discharge pipe 90 which opens downwardly through the top wall 52 into the tank 84 and a return pipe 92 is provided for piping hot water from the pump 16 into the top of the radiator (not shown) of the engine 10.

A vaporized fuel and air outlet pipe 94 opens through the top wall 52 of the tank 54 exteriorly of the tank 84 and discharges into the outlet end 44 of the pipe 40 as at 96 immediately above the air intake 46 of the carburetor 20. The pipe 94 is provided with a check valve 98 and a flow controlling valve 100 actuated by a solenoid 102.

In operation, the valve 100 is normally closed and the valve 72 is normally open to communicate the line or pipe 70 with the line 76 and to terminate communication between the line 80 and the line 70 when the engine is cold. If it is desired to start the engine 10 when cold, the ignition is turned on and the electric fuel pump 64 pumps fuel through the line 66, the heater 68 and lines 70 and 76 to the float chamber 78 of the carburetor 20. Then, as the starter motor of the engine 10 is operated, air is drawn in through the air intake 28, through the heat exchanger box 38 and then through the pipe 40 into the carburetor 20 whereby the latter forms a combustible charge of liquid fuel and air in the conventional manner. Of course, when the ignition is actuated, the heater 68 is actuated and the fuel being pumped to the carburetor 20 is heated so as to promote better vaporization of the fuel in the carburetor 20 even when the engine is being started when cold.

When operating temperatures of the engine are achieved, the air passing through the heat exchanger box 38 is warmed sufficiently to actuate the thermostat 104 so that the valve 100 may be actuated and the air passing through the pipe 48 and the tank 54 and into the pipe 94 is allowed to be discharged through the valve 100 and into the outlet end 44 of the pipe 40. At substantially the same time, the water being pumped through the tank 84 will be sufficiently heated to actuate the thermostat 106 and the latter will terminate operation of the heater 68 and actuate the solenoid 74 whereby liquid fuel being pumped through the line 70 will be diverted into the line or pipe 80, downwardly through the coil 82 and be discharged at 88 for substantially immediate vaporization by the discharge of heated secondary induction air being discharged from the outlet 56. This vaporized fuel and supplemental induction air will then pass through the pipe 94 and be discharged into the outlet end of the pipe 40. Of course, when the solenoid 74 is actuated, the passage of liquid fuel from the line 70 into the line 76 is terminated and thus the carburetor 20 is rendered inactive to discharge fuel therefrom and further operation of the engine 10 is dependent upon the discharge of supplemental induction air and vaporized fuel from the outlet 96 in the outlet end of the pipe 40.

If for any reason it is desired to start the engine 10 after a short interval when the engine 10 is still at operating temperature, the solenoids 74 and 102 may be provided with an override whereby liquid fuel may be pumped to the float chamber 78 of the carburetor 20 in the conventional manner until such time as the engine 10 has been started and the air pump or supercharger 30 has been placed in operation at sufficient speed to cause induction air to be pumped through the outlet 56 of the pipe 48 with sufficient velocity to vaporize any liquid fuel discharged from the outlet nozzle 88 of the pipe 80.

Figure 3:
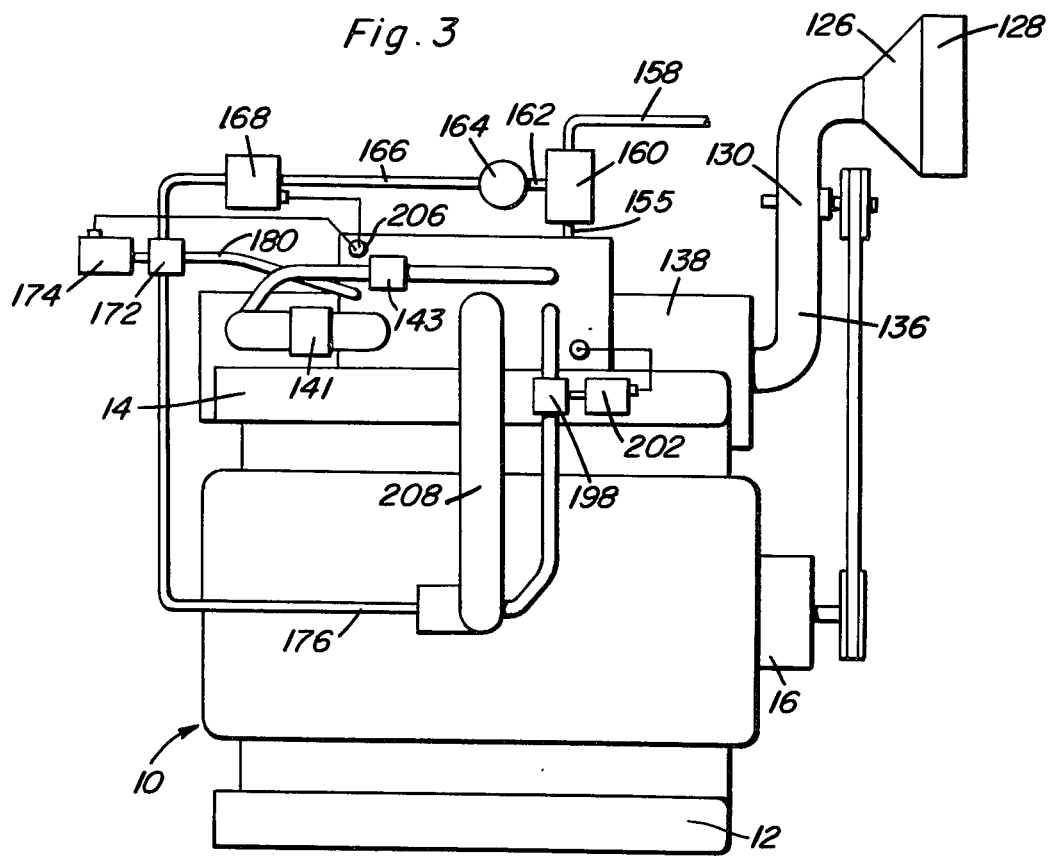
FIG. 3 is a schematic view, similar to FIG. 1, but illustrating a modified form of air and fuel charge forming device.
Figure 4:
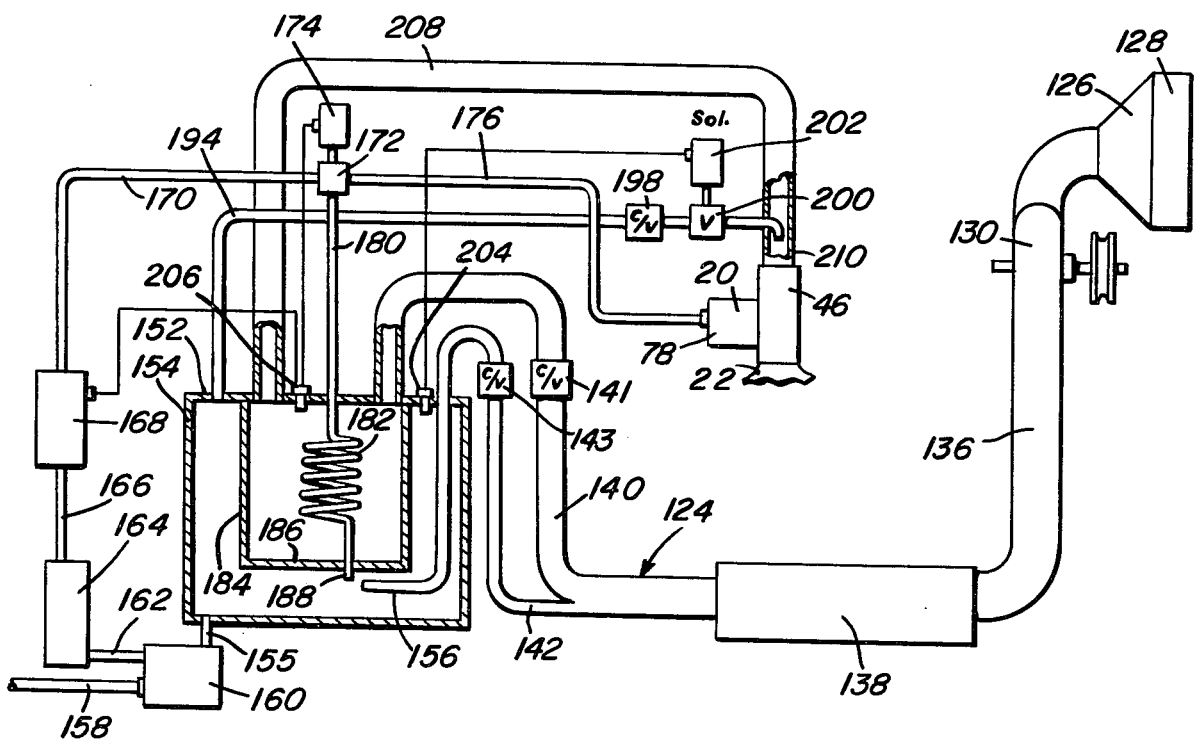
FIG. 4 is a further schematic view, similar to FIG. 2, but illustrating the working components of the air and fuel charge forming device illustrated in FIG. 3.

With reference now more specifically to FIGS. 3 and 4 of the drawings, there may be seen a modified form of air and fuel charge forming device referred to in general by the reference numeral 124. The charge forming device 124 is similar to the device 24 in that it includes an air inlet 126 corresponding to the inlet 26 and provided with an air filter 128. Further, device 124 includes an air pump or supercharger 130 corresponding to the supercharger 30 and an outlet pipe 136 for the supercharger 130 extending to a heat exchange box 138 including a primary induction air outlet pipe 140 and a secondary induction air outlet pipe 142. Also, the device 124 includes a liquid fuel supply line 158 corresponding to the line 58, a float chamber 160, a line 162, an electric fuel pump 164, a line 166, a heater 168, and a line 170 corresponding to the components 58, 60, 62, 64, 66, 68 and 70, respectively.

In addition, the device 124 includes components 152, 154, 156, 182, 184 and 188 corresponding to the components 52, 54, 56, 82, 84 and 88, respectively. Further, the bottom wall of the tank 184 is designated by the reference numeral 186 and the pipes 140 and 142 include check valves 141 and 143 corresponding to the check valves 42 and 50.

Also, the device 124 includes a pipe 194 corresponding to the pipe 94 provided with a check valve 198 and a flow control valve 200 corresponding to the valves 98 and 100 and the valve 200 is actuated by a solenoid 202. Further, thermostats 204 and 206 corresponding to the thermostats 104 and 106 are also provided.

However, the primary induction air pipe 140, provided with a check valve 141, opens downwardly through the top wall 152 into the interior of the tank 184 so that the warm induction air being discharged from the heat exchanger box 138 will be passed into intimate heat exchange relation with the coil 182. The induction air passing into the tank 184 is ducted therefrom by an outlet pipe 208 which includes an outlet end 210 in closed communication with the air inlet 46 of the carburetor 20. However, the line or pipe 170 corresponding to the pipe 70 is provided with a three-way valve 172 corresponding to the valve 72 and under the control of a solenoid 174 corresponding to the solenoid 74 with a first discharge line 180 from the valve 172 including the coil 182 and a second discharge line or pipe 176 from the valve 172 opening into the float chamber 78 of the carburetor 20.

In view of the foregoing, it may be seen that the operation of the air and fuel charge forming device 124 is substantially identical to the operation of the device 24, except that the coil 182 within the tank 184 is heated by heated induction air being passed through the tank 184 exteriorly of the coil 182. This heated air passing through the tank 184 is then ducted through the pipe or conduit 208 to the carburetor inlet 46, whereas the primary heated induction air outlet pipe for the heat exchanger box 38 extends directly to the inlet 46 of the carburetor 20 illustrated in FIG. 2. Thus, the fuel passing through the coil 182 is heated by heated induction air as opposed to hot water from the engine. Otherwise, the operation of the devices 24 and 124 are substantially identical.

With attention now invited more specifically to the lower left hand portions of FIGS. 2 and 4 of the drawings, if for any reason more liquid fuel is discharged from the outlet nozzles 88 and 188 than can be evaporated within the tanks 54 and 154, any liquid fuel collecting on the upper surface of the bottom walls of the tanks 54 and 154 passes downwardly by gravity through return lines 55 and 155 into the float chambers 60 and 160.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a combustion engine including heat dissipating means, air and fuel mixture induction passages having a conventional float chamber equipped carburetor operatively associated therewith including an air inlet and an outlet communicated with said induction passages, a supply of liquid fuel under pressure communicated with said float chamber, a supplemental air and fuel charge forming device, said device including an evaporator chamber including an inlet and an outlet, an air intake, first conduit means for ducting a first portion of air entering said intake into the interior of said chamber, second conduit means for ducting the remaining portion of air entering said intake to said carburetor inlet, third conduit means opening outwardly from said chamber and including an outlet communicated with said carburetor inlet, said engine heat dissipating means including means for heating substantially all of the air entering said air intake, pipe means communicating said supply of fuel under pressure with the carburetor float chamber and with the interior of said evaporator chamber for the discharge of liquid fuel into said evaporator chamber to be rapidly vaporized by the first portion of intake air discharged into said evaporator chamber, and valve means operatively associated with said pipe means for selectively communicating said supply of fuel under pressure with said carburetor float chamber and the interior of said evaporator chamber.

2. The combination of claim 1 including valve means operatively associated with said third conduit means operative to selectively establish and terminate communication between said evaporator chamber and said carburetor or air inlet through said third conduit means.

3. The combination of claim 2 wherein said valve means for said pipe means includes operator means operative in response to increases in engine temperature to actuate the pipe means valve means to terminate communication between said supply of fuel under pressure and said carburetor float chamber and establish communication between said supply of fuel and said evaporator chamber.

4. The combination of claim 3 wherein said valve means for said third conduit means includes operator means operative in response to increases and decreases in engine temperature to establish and terminate communication, respectively, between said evaporator chamber and said carburetor inlet through said third conduit means.

5. The combination of claim 1 wherein said engine heat dissipating means also includes means for heating the fuel immediately prior to its being discharged into said evaporator chamber.

6. The combination of claim 1 including means for heating the fuel passing through said pipe means.

7. The combination of claim 1 including means operative to return any liquid fuel collecting in said evaporator chamber to said source of fuel.

8. The combination of claim 1 wherein said engine heat dissipating means also includes means for heating the fuel immediately prior to its being discharged into said evaporator chamber, the last mentioned means including cooling water for said engine and means for passing said cooling water into good heat transfer relation with said fuel immediately before it is discharged into said evaporator chamber.

9. The combination of claim 1 wherein said engine heat dissipating means also includes means for heating the fuel immediately prior to its being discharged into said evaporator chamber, the last mentioned means including means for passing said remaining portion of heated air for said carburetor inlet into good heat transfer relation with said fuel immediately before it is discharged into said evaporator chamber.

10. The combination of claim 1 wherein said engine includes engine driven air pump means for pumping intake air through said first and second conduit means.

* * * * *